United States Patent

[11] 3,579,189

[72] Inventor Paul K. Weimer
Princeton, N.J.
[21] Appl. No. 783,591
[22] Filed Dec. 13, 1968
[45] Patented May 18, 1971
[73] Assignee RCA Corporation

[54] COUPLING AND DRIVING CIRCUIT FOR MATRIX ARRAY
7 Claims, 1 Drawing Fig.

[52] U.S. Cl. .......... 340/166, 340/167
[51] Int. Cl. .......... H04q 3/00
[50] Field of Search .......... 340/166, 166 (EC)

[56] References Cited
UNITED STATES PATENTS

| | | | |
|---|---|---|---|
| 3,142,819 | 7/1964 | Duinker | 340/166(EL) |
| 3,435,138 | 3/1969 | Borkan | 340/166(X) |
| 3,445,816 | 5/1969 | Polasek | 340/166 |
| 3,465,293 | 9/1969 | Weckler | 340/166 |
| 3,493,932 | 2/1970 | Yu | 340/166 |
| 3,502,802 | 3/1970 | Osborn | 340/166(X) |

*Primary Examiner*—Harold I. Pitts
*Attorney*—H. Christoffersen

ABSTRACT: A coupling circuit comprising N stages connected in parallel between two conductors. Each stage comprises the conduction paths, in series, of two field effect transistors and an output terminal at the connection of the two paths. The output terminals are connected to the respective rows of an array of light sensing circuits. One transistor of one stage is turned on to connect one row of circuits through one conductor to an output circuit to permit the circuits of that row to be read out, in sequence. Concurrently, the other transistor of the following stage is turned on to connect the following row of circuits through the second conductor to ground to permit the circuits of the following row to be precharged. The process is continued until all rows of the matrix are successively precharged and read out.

PATENTED MAY 18 1971 3,579,189
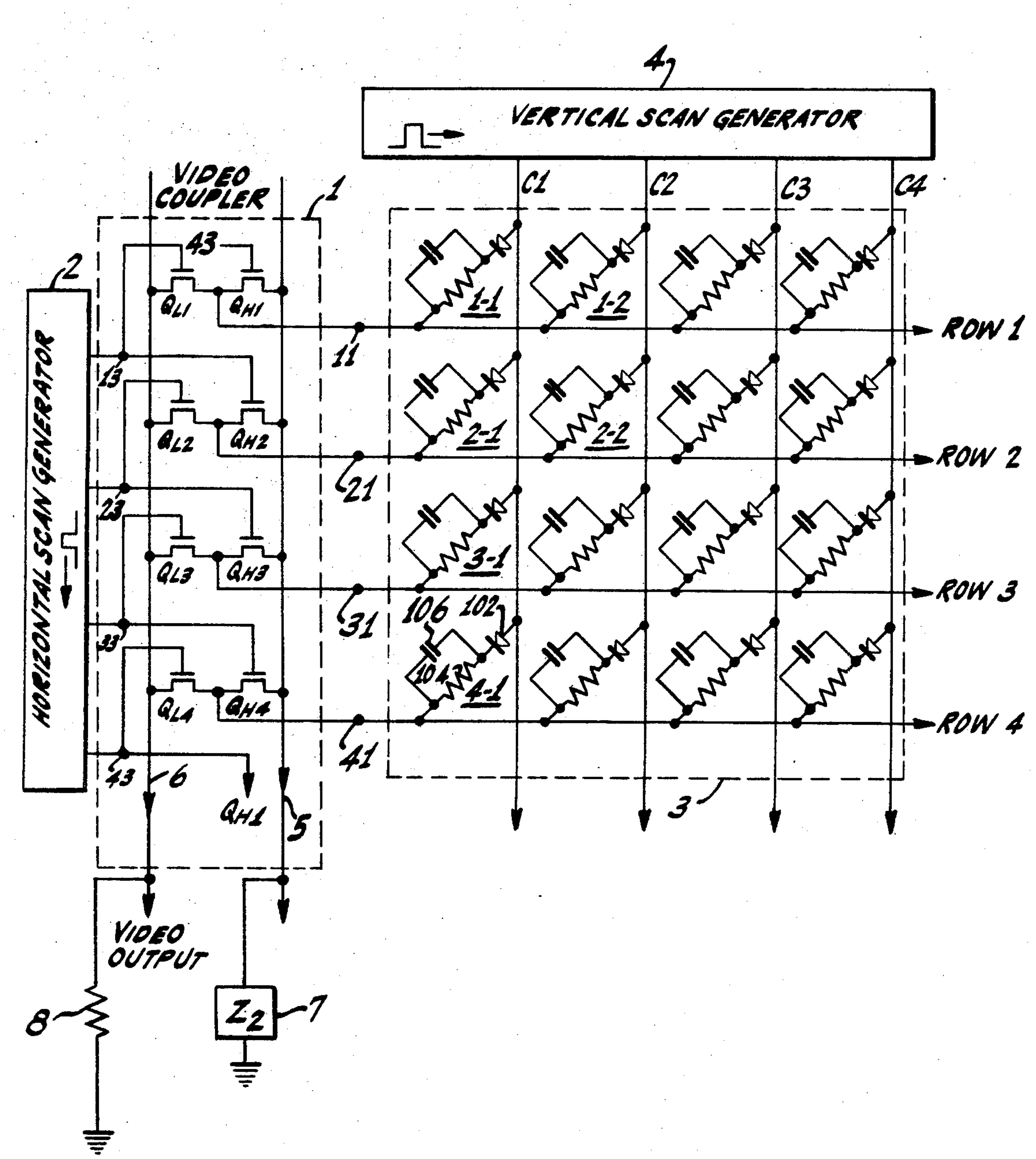
INVENTOR
PAUL K. WEIMER
BY H. Christoffersen
ATTORNEY

COUPLING AND DRIVING CIRCUIT FOR MATRIX ARRAY

This invention herein described was made in the course of or under a contract or subcontract thereunder with the Department of the Air Force.

BACKGROUND OF THE INVENTION

Solid-state arrays such as the image sensor 3 shown in the figure may be operated in the storage mode. These arrays consist of circuits 1–1, 1–2 and so on, which include the parallel combination of capacitance 106—whether distributed or discrete—on which charge may be stored and a current generator, shown as resistor 104, which may be a photoconductor or a PN junction whose current is proportional to the light intensity. Periodically, the capacitor is charged to a known value of potential. After the removal of the charging signal, the capacitor is allowed to discharge through the current generator for a set time period called the integration time. Recharging the capacitor, also called sampling the element, and measuring the amount of charge necessary to recharge it yields a video signal which is proportional to the light input.

Ideally, under conditions of zero ambient light, the current generator and any other impedance such as the back impedance of isolation diode 102 should present an infinite impedance to the capacitor. However, either due to the finite impedance of the photoconductor or the leakage current of the PN junction, there is always some discharge of the capacitor even though there is no incident light on the photosensitive element. Where the integration time is relatively long, the charge storage element 106 may completely discharge during a scan interval, even though element 104 receives zero light input, and this, of course, causes erroneous outputs to be produced by the matrix.

This problem may be alleviated by recharging each capacitor of the matrix a short period of time before that capacitor is sensed for video information. However, the system constraints are such that this is not as easy to accomplish as it might seem. For example, it is important that while the array is being recharged, video information is simultaneously extracted from the array. Otherwise, there is a resulting loss of information per unit time or more exactly, a shrinkage of system bandwidth. During the recharging of some circuits of the array and the scanning of others for video content, it is important that the mixing of useful with extraneous signals does not occur. Also, it is imperative that all elements scanned have the same integration time to render the sampled information useful.

The object of the present invention is to provide a simple circuit for concurrently prescanning (recharging) and scanning (reading out) an array of image sensing circuits which meets the requirements discussed above.

BRIEF SUMMARY OF THE INVENTION

N stages connected in parallel between two circuit points. Each stage comprises two series connected switches and an output terminal at the common connection of the switches. The switches are closed and then opened a pair at a time, in sequence, each pair comprising the first switch of one stage and the second switch of another stage. Each first switch which is closed is in the stage in which the second switch was closed the immediately preceding cycle.

BRIEF DESCRIPTION OF THE DRAWING

The sole FIGURE is a schematic drawing of the circuit embodying the invention in combination with an image sensor and associated scan generators.

DETAILED DESCRIPTION

The video coupler 1, also known as a scanning circuit, couples the horizontal scan generator 2 to the rows of the array 3, while vertical scan generator 4 is directly connected to the columns of the array 3. The coupler 1 consists of N stages, connected in parallel between a first conductor 5 and a second conductor 6. For purposes of the present application, N is shown to be equal to 4 and the array is shown to have four columns and four rows, however, in practice N is substantially larger than four.

Each state comprises two active devices such as field effect transistors and each device has its conduction path connected at one end to a common output point and at its other end to one of conductors 5 and 6. The first conductor 5 is connected through an impedance 7 of magnitude $_2$ to ground. Conductor 6 is the video output line and is connected through a load, shown as resistor 8, to ground or reference potential. The output terminals 11, 21 and so on of the video coupler connect to the respective rows 1, 2 and so on of the matrix 3.

The active devices in the coupling circuit are designated by the letter Q followed by a numeral subscript consisting of an H and a digit or an L and a digit. The H refers to the coupling conductor 5 and to the L to the coupling conductor 6, while the digit identifies the location of the stage. The respective terminals such as 13, 23 and so on between the scan generator 2 and the video coupler 1 and respective terminals 11, 21 and so on between the video coupler 1 and the matrix array 3 are each identified by a two digit number. The first digit refers to the coupler stage position and the second digit identifies the interface (3 between the scan generator and coupler and 1 between the coupler and matrix 3).

The active devices of the video coupler are N-channel insulated-gate field-effect transistors (IGFET's) of the enchancement type. Each device has a first (source) and a second (drain) electrode, a conduction path which extends between these electrodes, and a control (gate) electrode to which a voltage may be applied for controlling the impedance of the conduction path. In an N-type device, current flows between the source and drain when the voltage at the gate electrode is relatively positive compared to the voltage at the source electrode. Where, as here, the transistors conduct equally well in either direction, the direction of current flow is determined purely by the value of the potential between the source and drain electrodes, the source electrode for an N-type transistor being defined as that electrode of the two conducting electrodes which is connected to the lowest value of potential.

Structurally, the N stages are identical and, therefore, only a detailed description of the first stage is given. The conduction path of transistor $Q_{H1}$ is connected at one end (the source electrode) to conductor 5 and at the other end (the drain electrode) to output terminal 11; the conduction path of transistor $Q_{L1}$ is connected at one end (the drain) to output terminal 11 and at the other end (the source) to conductor 6. The gate electrode of transistors $Q_{L1}$ and $Q_{H2}$ are connected together at terminal 13, which is the output terminal of the first stage of scan generator 2. The gate electrode of transistor $Q_{H1}$ is connected to the $N^{th}$ output stage of scan generator 2 (in the present instance, N=4 so that the gate electrode of $Q_{H1}$ is connected to output terminal 43 of generator 2).

In mathematical terms, the FIGURE illustrates the case when the gate electrode of transistor $Q_{Li}$ of the $i^{th}$ stage ($1<i<N$) is connected to the gate electrode of the transistor $Q_{H(i+1)}$ of the $i+1^{th}$ stage. This connection ensures that two adjacent output lines are simultaneously energized. In general, however, the gate electrode of a $Q_L$ transistor may be connected to the gate electrode of a $Q_H$ transistor of any other stage.

In operation, if scan generator 2 is inactive, (no pulse produced at any of its output terminals) every gate electrode of the video coupler 1 is returned to a low point of potential so that all transistors are cut off. Output terminals 11 through 41 therefore float.

Suppose now that the generator 2 is turned on and a positive pulse appears only at its output terminal 13. This causes transistors $Q_{L1}$ and $Q_{H2}$ to conduct at the saturation level. Conducting transistor $Q_{L1}$ couples terminal 11, which corresponds to the first row of matrix 3, to conductor 6 and conducting transistor $Q_{H2}$ concurrently couples terminal 21 (row 2 of the matrix) to conductor 5. If, during the time the pulse is present at 13, the vertical scan generator 4 applies a positive pulse to column C1 of array 3, current flows through the array circuit 1–1 at the intersection of row 1 and column 1 and through the conduction path of transistor $Q_{L1}$ and via lead 6 to the video output circuit. Concurrently, the array circuit 2–1 at the intersection of row 2 and column 1 is recharged to the peak potential of the pulse applied to column C1. The recharging circuit is through conducting transistor $Q_{H2}$ and conductor 5 to ground via impedance $_2$. In this instance, $_2$ may be a negligible impedance but, where frame information is desired, $_2$ may be the input impedance of a video output amplifier. Thus, the video information contained in the circuit at location 1–1 is read out and concurrently the corresponding location of the following row is prescanned or recharged. During these concurrent operations, there is no mixing of the signals.

After the operations described above, the positive horizontal scan pulse continues to be applied only to terminal 13, but the output pulse from vertical scan generator 4 is advanced from column C1 to the next column C2. The pulse at C2 now causes the circuit 1–2 located at the intersection of row 1 and column 2 to be read out and the circuit 2–2 at the intersection of column 2 and row 2 concurrently to be recharged. This process continues until all circuits of row 1 of the matrix have been read out and all circuits of row 2 of the matrix have been recharged.

After the last column C4 has been pulsed, the pulse output from horizontal scan generator 2 is advanced to the following terminal 23. This pulse now causes transistors $Q_{L2}$ and $Q_{H3}$ to saturate thereby coupling terminal 21 through the low impedance of transistor $Q_{L2}$ to video output line 6 and terminal 31 through the low impedance of transistor $Q_{H3}$ to conductor 5. The vertical scan generator 4 once again applies sequential pulses to the columns in the manner described above to read out row 2 and recharge row 3. Note that the integration time of each circuit in row 2 is equal to the time it takes to read out the entire row 1. The same holds for the circuits in the following rows. Each such circuit has a full line time to integrate video information.

While for purposes of illustration each $Q_{Li}$ transistor is shown connected to a $Q_{H(i+1)}$ transistor, the invention is not restricted to this specific format. The gate electrode of each transistor $Q_{Li}$ may be connected to the gate electrode of a $Q_H$ transistor two, three or even N−1 stages away provided the scan generator is arranged to scan in corresponding fashion. The scan generator, in other words, should, after reading out one row and recharging another row, then read out the row just recharged.

It should be clear from the above discussion that the transistors used in the video coupler 1 are employed as simple, single-pole single-throw switches. Therefore, mechanical switches, or other electronic switches, may be used to implement the invention. Solid-state devices are preferred for a number of reasons including the possibility of large scale integration.

Though the invention has been illustrated using N-type devices, it should be obvious that P-type transistors are also suitable to practice the invention, provided appropriate choice of voltages is made.

I claim:

1. The combination comprising:
first and second circuit points;
N stages connected in parallel between these points, each stage comprising first and second normally open switches connected in series, and an output terminal at the connection point of said two switches; and
means for concurrently closing the first switch of one stage and the second switch of a second stage, then opening these switches and closing the first switch of said second stage and the second switch of a third stage, then opening these switches and continuing these closing and opening operations for all remaining stages until all switches have been closed at least once.

2. The combination as claimed in claim 1, wherein each switch is a transistor having a first and a second electrode and a conduction path between these two electrodes and having also a control electrode to which a voltage may be applied for controlling the conductivity of said conduction path.

3. The combination as claimed in claim 2, wherein each transistor is an insulated-gate field-effect transistor.

4. The combination as claimed in claim 3, wherein all of said transistors are of the same conductivity type.

5. The combination as claimed in claim 2, wherein the control electrode of each first switch is coupled to the control electrode of one second switch in a different stage than said first switch.

6. The combination as claimed in claim 5, wherein the control electrode of each first switch of a stage is coupled to the control electrode of the second switch of the immediately following stage.

7. The combination comprising:
a matrix of elements which, when operated, is accessed a row at a time and in which it is necessary to connect each row to one circuit point during the time the preceding row is connected to another circuit point;
a number of stages equal to the number of rows in the matrix, each stage comprising first and second normally open switches connected in series between said two circuit points, and each stage having a terminal at the point at which its two switches are connected, which is coupled to the corresponding row of said matrix; and
sequencing means for closing and then opening a pair of switches at a time, the first pair comprising the first switch of one stage and the second switch of a different stage, and each succeeding pair comprising the first switch of the stage in which the second switch was closed the immediately preceding cycle and a second switch of a different stage.

UNITED STATES PATENT OFFICE
CERTIFICATE OF CORRECTION

Patent No. 3,579,189 Dated May 18, 1971

Inventor(s) Paul Kessler Weimer

It is certified that error appears in the above-identified patent and that said Letters Patent are hereby corrected as shown below:

| | | |
|---|---|---|
| Col. 2 | Line 6 | delete "state" and insert therefor ---stage---. |
| | Line 10 | following "magnitude" insert ---Z---. |
| | Line 18 | delete first occurrence of "to". |
| Col. 3 | Line 9 | following "impedance" insert ---Z---. |
| | Line 11 | following "instance" insert ---Z---. |

Signed and sealed this 18th day of April 1972.

(SEAL)
Attest:

EDWARD M.FLETCHER,JR.
Attesting Officer

ROBERT GOTTSCHALK
Commissioner of Patents